United States Patent [19]

Gupte et al.

[11] 4,350,049

[45] Sep. 21, 1982

[54] DEVICE AND PROCESS FOR DRAWING OFF VERY SMALL QUANTITIES OF POWDER

[75] Inventors: Arun R. Gupte; Heinrich Kladders; Helmut Struth, all of Ingelheim am Rhein, Fed. Rep. of Germany

[73] Assignee: Boehringer Ingelheim GmbH, Ingelheim am Rhein, Fed. Rep. of Germany

[21] Appl. No.: 204,225

[22] Filed: Nov. 5, 1980

[30] Foreign Application Priority Data

Nov. 9, 1979 [DE] Fed. Rep. of Germany ....... 2945212

[51] Int. Cl.³ .............................................. G01N 1/14
[52] U.S. Cl. .................................................. 73/864.51
[58] Field of Search ................ 73/864, 864.51, 864.54, 73/864.72; 222/189, 630

[56] References Cited

U.S. PATENT DOCUMENTS 2,423,173  7/1947  Brady et al. ......................... 222/189
3,589,199  6/1971  Levin ................................ 73/864.54

*Primary Examiner*—Herbert Goldstein
*Attorney, Agent, or Firm*—Hammond & Littell, Weissenberger and Muserlian

[57] ABSTRACT

The invention is directed to an apparatus for drawing off powder in metered quantities of from about 0.5 to 10 mg, comprising a tubular member having a dosing chamber at one end, the chamber having walls consisting of porous material and the outer end of the chamber walls being air-tight, and being provided at the other end with a means for connecting the tubular member to vacuum and/or compressed air sources. The invention is also directed to a method of using such an apparatus.

5 Claims, 3 Drawing Figures

U.S. Patent          Sep. 21, 1982          4,350,049

DEVICE AND PROCESS FOR DRAWING OFF VERY SMALL QUANTITIES OF POWDER

FIELD OF THE INVENTION

This invention relates to a device for drawing off quantities of powder. More specifically, this invention relates to a device for drawing off very small quantities of powder and the process thereof.

BACKGROUND OF THE INVENTION

Devices are known with which powders in quantities as small as 10 mg can be drawn off. Such devices comprise a tube which is closed on one end with a displaceably arranged piece of felt. If the tube is dipped into a powder with the open end and if a vacuum is applied to the other end ($P_{abs}$ of from about 800 to 900 mbars), then the powder is drawn into the tube and held therein. The opening of the tube is then brought over the container to be filled, and it is emptied with compressed air. Quantities of powder above about 20 mg can be drawn off in this way with a standard deviation of about 2%, provided that micronized substances are not being transferred. With such micronized substances, the standard deviation is at least from approximately 8 to 10 percent with regard to quantities in the range of about 20 mg.

DETAILED DESCRIPTION OF THE INVENTION

Applicants have surprisingly developed a device with which powders, including micronized powders, can be drawn off with good accuracy in quantities in the range of from about 0.5 to about 10 mg, preferably from about 1 to about 9 mg. The device comprises a tubular member provided with a connection for vacuum and compressed air sources and having a metering or dosing chamber at an end thereof. The bottom and side-walls of the dosing chamber are comprised of porous material, and the end, or outer, side of the dosing chamber is air-tight.

Figure 1:
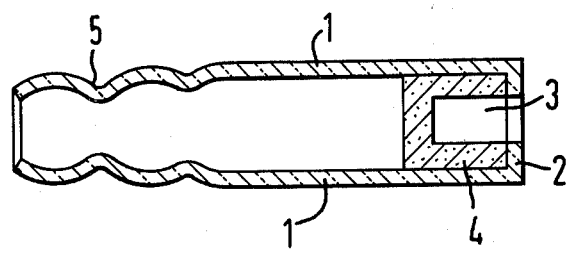
FIG. 1 represents an axial cross-section of the invention.

The device of the invention can be better appreciated by making reference to the drawings. In FIG. 1, a tube 1 of a suitable rigid material, such as metal, glass, or plastic, is provided with a flange-like end-portion 2. The end-portion 2 comprises an opening for dosing or metering chamber 3. The dosing chamber 3 has walls 4, which consist of a porous material, preferably sintered metal, ceramic, or sintered glass (fritting) of suitable pore size.

At the end of the device opposite end-portion 2 is a connecting part 5. Connecting part 5 provides means for connecting the device to a hose such as a vacuum or suction hose. The pressure in dosing chamber 3 can be regulated by means of the hose. The connecting part can also be equipped with a three-way valve which would permit selective connection to a suction line and/or a pressure line.

Tube or tubular member 1 is preferably cylindrical in shape but can also be rectangular, square, triangular, or the like. In fact, the tubular member 1 need not have a uniform cross-section. The diameter or effective diameter of the tubular cross-section, or at least of the portion encompassing dosing chamber 3, should be small enough to permit insertion into typical areas of application. For example, the cross-section may have a diameter or effective diameter of from about 0.1 to about 5 cm, preferably from about 0.2 to 2 cm. Tubular member 1 can be any suitable length, such as, for example, from about 2 to 50 cm.

Figure 2:
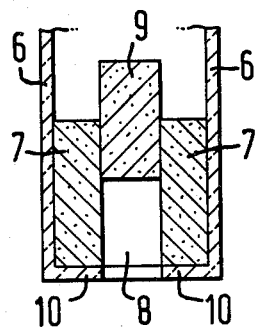
FIG. 2 represents a partial cross-section of an embodiment of the dosing chamber of the invention.

FIG. 2 illustrates an embodiment of the invention wherein the volume of the dosing chamber can be varied. A porous wall 7 of the dosing chamber is mounted fixedly into the lower part of tube 6. The recess 8 preferably has a cylindrical form; however, recess 8 could in practice have virtually any desired shape or configuration, such as cubic, spherical, or the like. It is preferred that recess 8 have either a uniform cross-section or a cross-section that diminishes in the direction of bottom piece 9 and that the opening in end-portion 2 correspond to the adjacent cross-section of recess 8. This would facilitate operation of the device according to the invention by not creating a condition which would tend to impede or prohibit flow of powder.

The bottom piece 9 comprises porous material and is fitted tightly into recess 8. Bottom piece 9 can be displaced axially, thereby enabling the holding capacity of the dosing chamber 3 to be varied within certain limits. The end 10 of chamber side wall 7 is made air-tight so that no powder can be deposited there.

Figure 3:
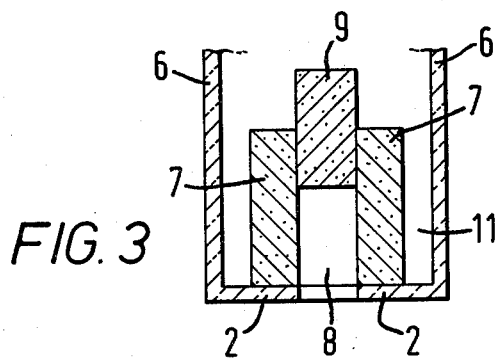
FIG. 3 represents a partial cross-section of another embodiment of the dosing chamber of the invention.

FIG. 3 illustrates a further embodiment of the dosing chamber in which an annular gap 11 is provided between the inner wall, impermeable to air, of the tube 6 and the outer wall, permeable to air, of the dosing chamber 3.

In the process according to the invention, a vacuum is created in the tube (the absolute pressure $P_{abs}$ therein amounts to from about 10 to 150, preferably from about 20 to 100, mbars), and the tube is then dipped a few millimeters into powder from which a quantity is to be drawn off. The holding capacity of the dosing chamber is selected or adjusted according to the dose to be drawn off. After the dosing chamber is filled, excess powder is scraped off and the opening of the dosing chamber is guided over the container which is to be filled. The pressure within the tube is then increased, preferably quickly and preferably to a pressure exceeding atmospheric pressure so that the quantity of powder in the dosing chamber is "blown out." Typically, a short blast of compressed air would be used. The magnitude of the pressure in excess of atmospheric pressure is not critical; however, too strong a blast of air is undesirable.

It has proven especially advantageous if the depth of the dosing chamber is not substantially larger or smaller than the diameter thereof.

The device according to the invention may have a dosing chamber of fixed volume. However, preferably dosing chamber 3 has means whereby its volume can be varied and means whereby its volume is indicated in some fashion on the external surface of the tube 1. The means for varying the volume of dosing chamber 3 could comprise a relatively simple arrangement whereby bottom piece 9 can be slidably arranged by pushing or pulling bottom piece 9 with a suitable implement inserted into recess 8 through the center of flange-like end-portion 2. On the other hand, bottom piece 9 may be rigidly connected to a mechanical means responsive to an external calibration or measuring means. For example, the outer portion of tube 1 may comprise any of several known means, such as a lever, a sliding bar, a vernier scale such as is on a micrometer caliper, or the like.

In comparison with the known devices which operate during the filling with a relatively small vacuum ($P_{abs}$ of from about 800 to 900 mbars), the invention provides a much smaller standard deviation and also clogging is prevented.

The process according to the invention thus offers the possibility of drawing off substances such as, for example, micronized pharmaceuticals, in quantities of a few milligrams with sufficient accuracy and safety against disturbances into capsules or other containers for single doses. Hard gelatine capsules for inhalation therapy which are filled in this way can be used, for example, in inhalation appliances such as are described in German Published Application (DE-OS) No. 2,346,914.

It should be noted that while the device described herein is intended to be used for drawing off metered quantities of powder, the device may also have application with some liquids.

The following example is intended to illustrate the invention and is not to be construed as limiting the invention thereto.

EXAMPLE

To demonstrate the effectiveness of the invention herein, a device according to the invention, Device A, and a ACCOFIL® LM-14 powder filler, commercially available from PERRY IND. INC., Hicksville, N.Y. Device B, were employed to draw off specified quantities of powder. The amounts drawn off, and the standard derivatives, in percent, based upon the amounts intended to be drawn off, are set forth in the following table:

TABLE

| Sample | Quantity Drawn off | Substance | Standard Device Device A | Device B |
|---|---|---|---|---|
| 1 | 5.6 mg | corn starch | — | 9.7% |
| 2 | 5.7 mg | micronized glucose | — | 17.6% |
| 3 | 5.6 mg | micronized glucose | 3.0% | — |
| 4 | 2.1 mg | micronized glucose | 4.7% | — |

It can be seen from the table that Device A, the device according to the invention, was substantially superior to Device B with regard to drawing off specified quantities of powder.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An apparatus for drawing off powder in metered quantities of from about 0.5 to 10 mg, comprising a tubular member having a dosing chamber at one end, the dosing chamber having walls consisting of porous material and the outer surfaces of the dosing chamber walls being air-tight against the inner wall of said tubular member, and being provided at the other end with a means for connecting the tubular member to vacuum and/or compressed air sources.

2. The apparatus of claim 1, wherein the chamber end of the tube has a flange whereby the opening of the chamber comprises the center of the flange.

3. The apparatus of claim 1, wherein the dosing chamber walls comprise side walls and a bottom section.

4. The apparatus of claim 3, wherein the bottom section is axially displaceable.

5. An apparatus for drawing off powder in metered quantities of from about 0.5 to 10 mg, comprising a tubular member having a dosing chamber at one end and being provided at the other end with a means for connecting the tubular member to vacuum and/or compressed air sources, wherein the dosing chamber has walls consisting of porous material, the dosing chamber end of the tube has a flange whereby the opening of the chamber comprises the center of the flange, and the outer surfaces of the dosing chamber walls are air-tight against the inner surface of the flange.

* * * * *